US009658873B2

(12) United States Patent
Tsirkin

(10) Patent No.: US 9,658,873 B2
(45) Date of Patent: May 23, 2017

(54) SWITCHING BETWEEN DEVICES HAVING A COMMON HOST BACKEND IN A VIRTUALIZED ENVIRONMENT

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 170 days.

(21) Appl. No.: 13/972,544

(22) Filed: Aug. 21, 2013

(65) Prior Publication Data

US 2015/0058838 A1   Feb. 26, 2015

(51) Int. Cl.
*G06F 9/455* (2006.01)
*G06F 9/48* (2006.01)
*G06F 9/50* (2006.01)

(52) U.S. Cl.
CPC ......... *G06F 9/45558* (2013.01); *G06F 9/455* (2013.01); *G06F 9/45533* (2013.01); *G06F 9/48* (2013.01); *G06F 9/4843* (2013.01); *G06F 9/4856* (2013.01); *G06F 9/4862* (2013.01); *G06F 9/4868* (2013.01); *G06F 9/50* (2013.01); *G06F 9/5083* (2013.01); *G06F 9/5088* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| 7,526,577 | B2 | 4/2009 | Pinkerton et al. | |
|---|---|---|---|---|
| 7,743,389 | B2 | 6/2010 | Mahalingam et al. | |
| 7,865,893 | B1* | 1/2011 | Omelyanchuk et al. | 718/1 |
| 7,917,811 | B2 | 3/2011 | Yamamoto | |
| 7,945,436 | B2 | 5/2011 | Ang et al. | |
| 2003/0023895 | A1 | 1/2003 | Sinha et al. | |
| 2005/0193273 | A1* | 9/2005 | Burkey | 714/42 |
| 2008/0307213 | A1* | 12/2008 | Sekiguchi et al. | 713/1 |
| 2009/0119087 | A1* | 5/2009 | Ang et al. | 703/23 |
| 2009/0164990 | A1* | 6/2009 | Ben-Yehuda et al. | 718/1 |
| 2010/0250824 | A1* | 9/2010 | Belay | 711/6 |
| 2011/0145814 | A1* | 6/2011 | Mangione-Smith | 718/1 |
| 2011/0154332 | A1 | 6/2011 | Shirae et al. | |

(Continued)

OTHER PUBLICATIONS

Zhai et al, "Live Migration with Pass-through Device for Linux VM", Proceedings of the Linux Symposium, vol. 2, Jul. 2008, pp. 261-267.*

Huang et al, "Nomad: Migrating OS-bypass Networks in Virtual Machines", 2007, ACM, pp. 158-168.*

SR-IOV VF Failover and Live Migration Support; pp. 1-2; retrieved on Nov. 13, 2013 from http://msdn.microsoft.com/en-us/library/windows/hardware/hh440249(v=vs.85).aspx "used with permission from Microsoft".

(Continued)

*Primary Examiner* — Charles Swift
(74) *Attorney, Agent, or Firm* — Haynes and Boone, LLP

(57) ABSTRACT

Systems and methods are disclosed for switching between an assigned device and an emulated device. An example system includes a device-specific driver and a pass-through device driver included in a hypervisor. A common host backend is bound to at most one of the device-specific driver and pass-through device driver at a time. The assigned and emulated devices access the common host backend. The system also includes a switch module that sends one or more communications to a guest to cause the guest to switch from using at most one of the assigned device or the emulated device to the other of the at most one of the assigned device or the emulated device.

19 Claims, 6 Drawing Sheets

(56) References Cited

U.S. PATENT DOCUMENTS

| | | | | |
|---|---|---|---|---|
| 2011/0172534 | A1* | 7/2011 | Kim | A61B 8/14 600/443 |
| 2011/0246171 | A1* | 10/2011 | Cleeton et al. | 703/25 |
| 2012/0054740 | A1* | 3/2012 | Chakraborty et al. | 718/1 |
| 2012/0180043 | A1* | 7/2012 | Tsirkin | G06F 9/5088 718/1 |
| 2012/0254862 | A1* | 10/2012 | Dong | 718/1 |
| 2012/0265910 | A1 | 10/2012 | Galles et al. | |
| 2012/0324442 | A1* | 12/2012 | Barde | H04L 49/70 718/1 |
| 2013/0034021 | A1* | 2/2013 | Jaiswal | H04L 12/4641 370/255 |
| 2013/0046892 | A1 | 2/2013 | Otani | |
| 2013/0311989 | A1* | 11/2013 | Ota et al. | 718/1 |
| 2014/0310704 | A1* | 10/2014 | Cantu | G06F 9/45558 718/1 |

OTHER PUBLICATIONS

John Howard, Everything You Wanted to Know about SR-IOV in Hyper-V Part 6; Mar. 19, 2012; pp. 1-3; retrieved on Jul. 24, 2013 from http://blogs.technet.com/b/jhoward/archive/2012/03/19/everything-you-wanted-to-know-about-sr-iov-in-hyper-v-part-6.aspx "used with permission from Microsoft".

Mallik Mahalingam, "I/O Architectures for Virtualization" http://xpgc.vicp.net/course/svt/TechDoc/ch12-IOArchitechturesForVirtualization.pdf, VMWorld 2006 (24 pages).

N.R. Challa, "Hardware Based I/O Virtualization Technologies for Hypervisors, Configurations and Advantages—A Study" http://ieeexplore.ieee.org/xpl/login.jsp?tp=&arnumber=6354610&url=http%3A%2F%2Fieeexplore.ieee.org%2Fxpls%2Fabs_all.jsp%3Farnumber%3D6354610, IEEE Xplore®, Cloud Computing in Emerging Markets (CCEM), Oct. 11-12, 2012 (2 pages).

\* cited by examiner

SWITCHING BETWEEN DEVICES HAVING A COMMON HOST BACKEND IN A VIRTUALIZED ENVIRONMENT

BACKGROUND

The present disclosure generally relates to a computing system, and more particularly to using devices in a virtual environment.

A virtual machine is a portion of software that, when executed on appropriate hardware, creates an environment allowing the virtualization of an actual physical computer system. Each virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

BRIEF SUMMARY

This disclosure relates to switching between virtual devices having a common host backend. Methods, systems, and techniques for switching between an assigned device and an emulated device having a common host backend are provided.

According to an embodiment, a system for switching between an assigned device and an emulated device includes a device-specific driver included in a hypervisor running on a host. The system also includes a pass-through device driver included in the hypervisor. A common host backend is coupled to the host and is bound to at most one of the device-specific driver and pass-through device driver at a time. When the common host backend is bound to the pass-through device driver, a guest running on a virtual machine uses a device assigned to the virtual machine. When the common host backend is bound to the device-specific driver, the guest uses an emulated device. The virtual machine is running on the host, and the assigned and emulated devices use the common host backend. The system also includes a switch module that sends one or more communications to the guest to cause the guest to switch from using at most one of the assigned device or the emulated device to the other of the at most one of the assigned device or the emulated device.

According to another embodiment, a method of switching between an assigned device and an emulated device includes binding a common host backend to at most one of a device-specific driver included in a hypervisor and a pass-through device driver included in the hypervisor. When the common host backend is bound to the pass-through device driver, a guest running on a virtual machine uses a device assigned to the virtual machine. When the common host backend is bound to the device-specific driver, the guest uses an emulated device. The common host backend is coupled to a host and the virtual machine is running on the host. The assigned and emulated devices use the common host backend. The method also includes sending one or more communications to the guest to cause the guest to switch from using at most one of the assigned device or the emulated device to the other of the at most one of the assigned device or the emulated device.

According to another embodiment, a non-transitory machine-readable medium includes a plurality of machine-readable instructions that when executed by one or more processors are adapted to cause the one or more processors to perform a method including: binding a common host backend to at most one of a device-specific driver included in a hypervisor and a pass-through device driver included in the hypervisor, where when the common host backend is bound to the pass-through device driver, a guest running on a virtual machine uses a device assigned to the virtual machine, and when the common host backend is bound to the device-specific driver, the guest uses an emulated device, where the common host backend is coupled to a host and the virtual machine is running on the host, and where the assigned and emulated devices use the common host backend; and sending one or more communications to the guest to cause the guest to switch from using at most one of the assigned device or the emulated device to the other of the at most one of the assigned device or the emulated device.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
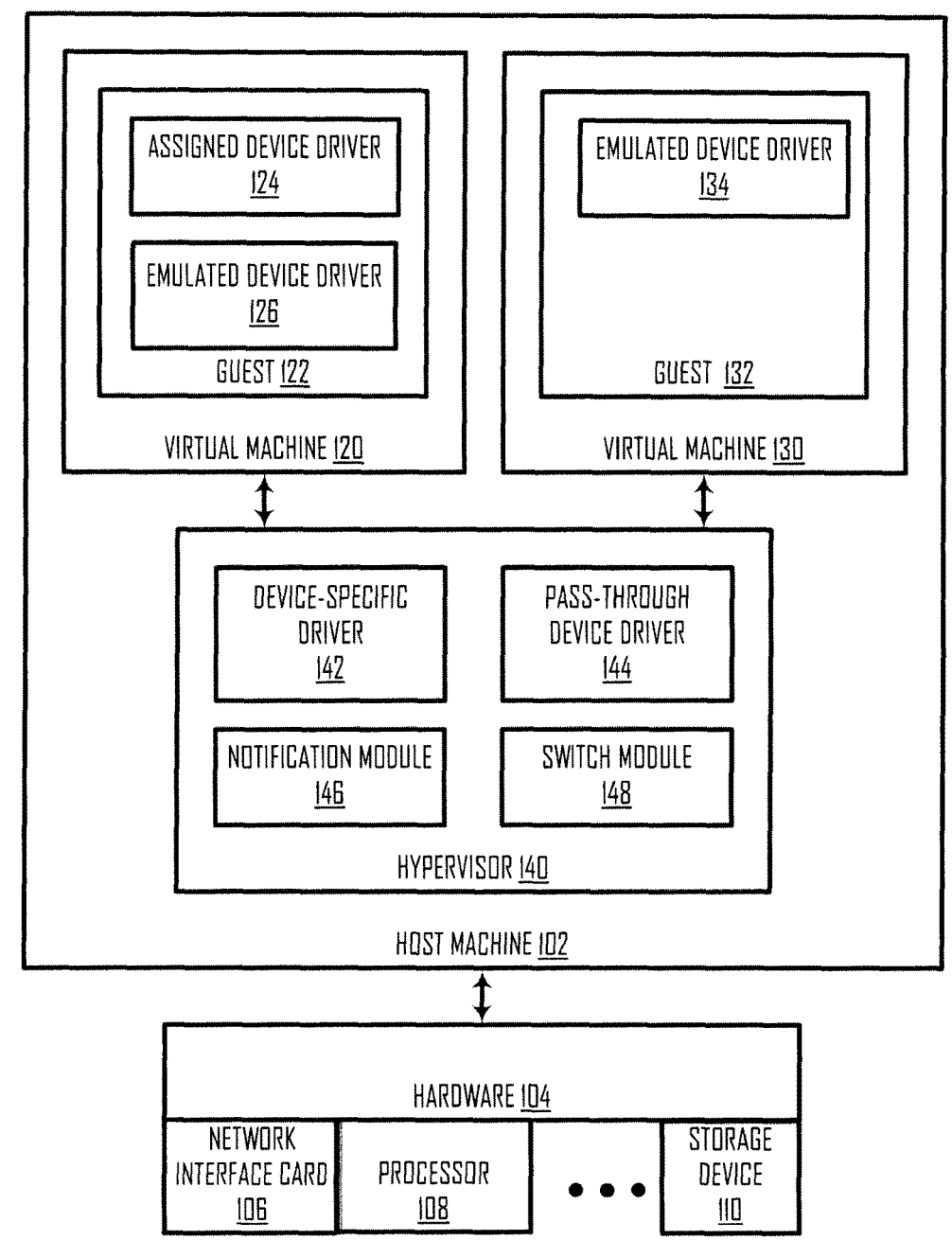
FIG. 1 is a simplified block diagram illustrating a system for switching between an assigned device and an emulated device, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview

II. Example Host Machine

A. Assigned and Emulated Devices Exposed to the VM
B. Switching Between Virtual Devices Having a Common Host Backend
   1. Switching From an Assigned Device to an Emulated Device
   2. Switching From an Emulated Device to an Assigned Device
III. Example Methods
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The hypervisor may assign a device to a virtual machine (VM) running on a host machine. An assigned device is a physical device that is exposed to a guest as part of the VM and may also be known as a pass-through device. Device assignment allows the guest running on the VM to which the device is assigned to have direct access to the device. The overhead of virtualization is low because a big portion of the functionality for accessing the assigned device is running within the VM. Accordingly, device assignment may result in faster performance compared to the guest accessing an emulated device. Assigning a device to the VM, however, may have some disadvantages. For example, when the device is assigned to a VM, the device can only be used exclusively by the VM to which the device is assigned and cannot be assigned to another VM. Further, migration of the VM and memory overcommitment of the VM are disabled. For example, it may be difficult to migrate a VM from one host machine to another because the specificity of a physical device on the physical server becomes exposed to guest software.

With an emulated device, the emulation can run on any physical server, independent of the specifics of the physical device. An emulated device may refer to a device that is implemented by the hypervisor and is exposed to the guest as part of the VM. In an example, the emulated device may be a purely virtual device that mimics real hardware. In such an example, the emulated device may be implemented using full emulation such that the device driver to which the emulated device is assigned may work on the hardware coupled to the host machine. In another example, the emulated device may be a paravirtualized device that is controlled by a device driver that is written for a specific hypervisor. In such an example, the emulated device may be implemented using paravirtualization such that the device driver to which the emulated device is assigned does not work on the hardware coupled to the host machine.

In emulation, no direct requirement exists for virtual and physical devices to be similar, and an access request by the guest can be executed by the hypervisor on behalf of the guest. Accordingly, a migrating VM continues to view the same set of virtual devices across the migration. An emulated device may provide uniformity, with the emulation layer masking any diversity at the level of the physical device. The virtual device may look the same in the source and destination host machines, and the VM may be migrated to another host machine because the guest is using a virtual device that does not need to look like a physical device. As such, the state of a virtual device running on a source host machine may be migrated to a destination host machine without disturbing the guest. An emulated device, however, consumes processor cycles, while assigning a device to the VM avoids much of the emulation overhead. As such, operations from within the guest are likely to be faster with assigned devices than with emulated devices.

It may be desirable to remove the performance/features trade-off of device assignment by having the guest switch between an assigned device and an emulated device, where the assigned and emulated devices have a common host backend. The common host backend may be a physical device. The switching may be done almost transparently to the user.

II. Example Host Machine

FIG. 1 is a simplified block diagram illustrating a system 100 for switching between an assigned device and an emulated device, according to an embodiment.

System 100 includes a host machine 102 coupled to hardware 104. Hardware 104 includes network interface card (NIC) 106, processor 108, storage device 110, and may include other I/O devices. A host machine may run one or more VMs that run applications and services. Host machine 102 includes a VM 120, a VM 130, and a hypervisor 140. Although two VMs are illustrated as running on host machine 102, other embodiments including fewer than or more than two VMs are within the scope of the present disclosure. The hypervisor may allow multiple operating systems, called guests, to run on the same physical system by offering virtualized hardware to the guest. The host machine may run multiple operating systems, concurrently and in isolation from other programs on a single system. A VM may include a guest that executes a device driver that communicates with the hardware devices.

A. Assigned and Emulated Devices Exposed to the VM

A guest 122 running on VM 120 includes an assigned device driver 124 and an emulated device driver 126. In an example, hypervisor 140 sends one or more communications to guest 122 to cause guest 122 to bind assigned device driver 124 to an assigned device. Guest 122 may activate or deactivate assigned device driver 124 depending on whether guest 122 should access the assigned device. In another example, hypervisor 140 sends one or more communications to guest 122 to cause guest 122 to bind emulated device driver 126 to an emulated device. Guest 122 may activate or deactivate emulated device driver 126 depending on whether guest 122 should access the emulated device. A guest 132 running on VM 130 includes an emulated device driver 134. In an example, hypervisor 140 sends one or more communications to guest 132 to cause guest 132 to bind emulated device driver 134 to an emulated device. Guest 132 may activate or deactivate emulated device driver 134 depending on whether guest 132 should access the emulated device. Guest 122 may run a different operating system than guest 132. The guest running on a VM may also be different from the host OS running on host machine 102. The host OS or guest may include, for example, MICROSOFT® WINDOWS®, LINUX®, SOLARIS®, and MAC® OS. Trademarks are the property of their respective owners.

Hypervisor 140 may provide guest 122, 132 with access to a device to perform input/output (I/O). The device may be a physical hardware device or an emulated hardware device. In an embodiment, the assigned and emulated devices access a common host backend that is coupled to host machine 102. When guest 122, 132 seeks to access the host backend, guest 122, 132 may access the assigned device or the emulated device. Accordingly, the same host backend device may be used in a different configuration.

Hypervisor 140 includes a switch module 148 and a notification module 146. In an embodiment, switch module 148 may send one or more communications to the guest to cause the guest to switch from using at most one of the assigned device or the emulated device to the other of the at most one of the assigned device or the emulated device. Two different devices (e.g., assigned and emulated devices) may be exposed to the guest.

In an example, switch module 148 sends the one or more communications to the guest to cause the guest to switch from the assigned device to the emulated device. In such an example, the guest may stop using the assigned device and switch to the emulated device. In another example, switch module 148 sends the one or more communications to the guest to cause the guest to switch from the emulated device to the assigned device. In such an example, the guest may stop using the emulated device and switch to the assigned device.

The mechanism by which the guest switches from one device to the other device may use existing mechanisms within the guest such that it may be unnecessary to modify code within the guest. In an example, sending the one or more communications to the guest to cause the guest to switch from using at most one of the assigned device or the emulated device to the other of the at most one of the assigned device or the emulated device may include sending a hot unplug request to the guest. The hot unplug request may indicate to the guest that the device (e.g., assigned device or emulated device) is going to be removed and to stop using it. In such an example, no device may actually be removed but the hot unplug request may be used to cause the guest to stop using the device. In another example, sending the one or more communications to the guest to cause the guest to switch from using at most one of the assigned device or the emulated device to the other of the at most one of the assigned device or the emulated device may include sending a device failure report to the guest. The device failure report may indicate to the guest that the device (e.g., assigned device or emulated device) failed and to stop using it. In such an example, no failure may actually exist but the device failure report may be used to cause the guest to stop using the device.

The common host backend device may be a partition of a physical device for use for virtualization, and each partition may be operated on separately and independently. The physical device may expose a plurality of interfaces including a physical interface and a virtual interface. Each virtual interface can be treated by the guest and the hypervisor as an independent common host backend. When the guest accesses an assigned device, the virtual interface of the physical device may be used. The virtual interface may be a virtual function of the device that is assigned to the VM. If the common host backend is a virtual function, both guest 122 and hypervisor 140 may use the same virtual function. If the common host backend is a physical function, both guest 122 and hypervisor 140 may use the same physical function.

In an embodiment, notification module 146 notifies a VM running on host machine 102 that a device has been assigned to the VM. In an embodiment, hypervisor 140 includes an assignment module (not shown) that assigns the device to the VM. Hypervisor 140 may assign a device to a VM and dynamically give a guest as part of the VM control over the assigned device. In an example, the device is a virtual function of a PCI device created using single root input/output virtualization (SR-IOV) and that is assigned to the VM. The assigned and emulated devices may be on the PCI bus and the notification may be separate from the devices. The device may be, for example, a network device or a storage device.

The following is a description of VM 120 and guest 122. This description may apply as well to VM 130 and guest 132. In an example, hypervisor 140 may assign NIC 106 and storage device 110 to VM 120, and notification module 146 may notify VM 120 that NIC 106 and storage device 110 has been assigned to VM 120. When a device is assigned to VM 120, guest 122 as part of VM 122 may execute assigned device driver 124 that communicates directly with the assigned hardware device without mediation from hypervisor 140. In an example, guest 122 includes an assigned device driver that is specific to NIC 106 and another assigned device driver that is specific to storage device 110 (not shown).

Guest 122 may activate or deactive assigned device driver 124 and emulated device driver 126. In an example, assigned device driver 124 is active and is specific to NIC 106. In such an example, guest 122 accesses the assigned device using assigned device driver 124. Any guest as part of a VM to which a device is assigned may be capable of controlling the device. The device may be assigned to and controlled by at most one VM at any point in time. Guest 122 may bypass hypervisor 140 and directly access the assigned NIC (e.g., to receive and send data over a network) and/or the assigned storage device (e.g., to store data). In another example, emulated device driver 126 is active and is specific to NIC 106. In such an example, guest 122 accesses the emulated device using emulated device driver 126.

Hypervisor 140 also includes a device-specific driver 142 and pass-through device driver 144. In an embodiment, a common host backend that is used by an assigned device and an emulated device is bound to at most one of device-specific driver 142 and pass-through device driver 144 at a time. Switch module 148 may bind and/or unbind the common host backend to device-specific driver 142 and/or pass-through device driver 144 depending on whether the guest should access the assigned device or the emulated device.

In an example, when the common host backend is bound to pass-through device driver 144, the assigned device is exposed to the VM. In such an example, the guest uses the assigned device, and pass-through device driver 144 receives a request from the guest to access the assigned device and forwards the request to the common host backend. Pass-through device driver 144 is not specific to a device and does not provide the functionality of the device. Rather, pass-through device driver 144 receives requests from and passes requests to a particular guest when a device is assigned to the particular guest. Switch module 148 may bind the common host backend to pass-through device driver 144 so that guest 122 accesses the common host backend using pass-through device driver 144.

In another example, when the common host backend is bound to device-specific driver 142, the emulated device is exposed to the VM. In such an example, the guest uses the emulated device, and device-specific driver 142 receives a request from the guest to access the emulated device and forwards the request to the common host backend. Device-specific driver 142 is specific to a device and provides the functionality of the device. Switch module 148 may bind the common host backend to device-specific driver 142 so that hypervisor 140 accesses the common host backend using device-specific driver 142.

In an embodiment, hypervisor 140 notifies guest 122 to use at most one of the assigned device and emulated device at a time. Hypervisor 140 may notify guest 122 that the assigned device and emulated device share a common host backend. Hypervisor may notify guest 122 to use at most one of the assigned device and emulated device at a time and/or notify guest 122 that the assigned device and emulated device share a common host backend before guest 122 switches from using at most one of the assigned device or the emulated device to the other of the at most one of the assigned device or the emulated device. In an example, hypervisor 140 notifies guest 122 that two devices, one assigned device and one emulated device, are in a failover configuration and share a common host backend that is a single physical device.

B. Switching Between Virtual Devices Having a Common Host Backend

1. Switching from an Assigned Device to an Emulated Device

In an embodiment, switch module 148 may send one or more communications to guest 122 to cause guest 122 to switch from using the assigned device to the emulated device. The assigned device and the emulated device may have a common host backend that is coupled to the host. Responsive to the one or more communications, guest 122 may stop using the assigned device. When switch module 148 detects that guest 122 has stopped using the assigned device, switch module 148 may unbind the common host backend from pass-through driver device 144 and bind the common host backend to device-specific driver 142. In this way, switch module 148 may expose the emulated device to guest 122.

Switch module 148 may remove from guest 122 access to the assigned device, and guest 122 may deactivate assigned device driver 124 and activate emulated device driver 126. After switch module 148 removes from guest 122 access to the assigned device, when guest 122 attempts to access the assigned device, hypervisor 140 may send an access denied message to guest 122. As such, guest 122 may only be allowed to access the emulated device via hypervisor 140.

Device assignment and emulation may have their own set of advantages. As discussed, a guest that accesses an assigned device may be able to access it faster compared to an emulated device. As such, it may be advantageous to assign a device to a VM and allow the guest as part of the VM to access the device. At a later point in time, it may be advantageous for the guest to switch from the assigned device to the emulated device to enable the VM, for example, to migrate to a destination host machine. With emulation, the migration may be enabled. The migration may be performed for various reasons. For example, the destination host machine may have more computing resources available compared to the source host machine running the VM.

In an example, switch module 148 may receive a notification that VM 120 is to be migrated from a source host machine to a destination host machine (not shown). The source and destination host machines may be coupled over a network. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

When switch module 148 receives the notification that VM 120 is to be migrated from a source host machine to a destination host machine, switch module 148 may send one or more communications to VM 120 to cause the VM to switch from using the assigned device to the emulated device. In an embodiment, hypervisor 140 includes a migration module (not shown in FIG. 1). After the guest switches to using the emulated device, the migration module migrates a state of the VM to the destination host machine. When the migration module migrates the state of the VM, the common host backend may be bound to device-specific driver 142.

In another example, emulation may enable a single physical device to be used by a plurality of guests. It may be advantageous for a guest to switch from an assigned device to an emulated device to enable sharing of an interface of the device between the plurality of guests. For example, a device may be assigned to VM 120 that uses an interface of the device. Switch module 148 may receive a request to use the interface that is used by guest 122 for guest 132 running on VM 130, and responsive to the request switch module 148 may send the one or more communications to cause guest 122 to switch from using the assigned device to the emulated device. After guest 122 has switched from using the assigned device to the emulated device, switch module 148 may then enable sharing of the interface between guests 122 and 132. Hypervisor 140 may receive a request from guest 122 or guest 132 and pass the request to the physical device. When hypervisor 140 receives a response responsive to the request, hypervisor 140 may pass the response along to the appropriate guest. In an example, hypervisor 140 multiplexes and de-multiplexes the requests such that the physical device performs an action responsive to one or more requests from each of the guests.

It may also be advantageous for a guest to switch from an assigned device to an emulated device to enable sharing of an interface of the device between the VM and the hypervisor. For example, a device may be assigned to VM 120 that uses an interface of the device. Switch module 148 may receive a request to use the interface that is used by guest 122 for hypervisor 140, and responsive to the request switch module 148 may send the one or more communications to cause guest 122 to switch from using the assigned device to the emulated device. After guest 122 has switched from using the assigned device to the emulated device, switch module 148 may then enable sharing of the interface between guest 122 and hypervisor 140.

In another example, it may be advantageous for the guest to switch from an assigned device to an emulated device to enable memory overcommitment. With emulation, memory overcommitment may be enabled. Switch module 148 may receive a request from an administrator to enable memory overcommit for the VM. Responsive to the request, switch module 148 may send one or more communications to the guest running on the VM to cause the guest to switch from using the assigned device to the emulated device.

An assigned device has complete access to the memory of the VM to which the device is assigned. The assigned device may be associated with memory regions that are mapped to the VM. The assigned device may make use of memory regions that allow the processor to interact with the device via reads and writes to the memory. The memory regions may be implemented in different ways depending on the architecture and platform (e.g., Memory Mapped I/O (MMIO) or I/O port regions). As such, the memory is accessible to the assigned device.

The memory access is performed by the hypervisor, and the hypervisor may facilitate access to the mapped memory regions. The hypervisor may move content from the memory of the VM to a storage device (e.g., cheaper storage such as disk storage). The hypervisor may move the content to the cheaper storage device when the content is not being used. The hypervisor may detect whether or not the guest as part of the VM has attempted to access the emulated device. In contrast to a device assignment in which the guest bypasses the hypervisor to access the assigned device, for emulation the hypervisor is aware when the guest desires to access the emulated device because the hypervisor receives the request for access to the emulated device from the guest. When the guest attempts to access the device, the access is trapped by the hypervisor. The hypervisor may receive the indication that the guest has attempted to access the device based on the trapped access attempt. Based upon this indication, the hypervisor may move the content back to the mapped memory area. In an example, the emulated device is a PCI device that exposes the memory regions through base address registers.

The hypervisor may trap the access attempt by the guest to the memory region, and perform an access to the device on behalf of the guest based on the trapped access attempt. In an example, if the guest attempts to read from the memory region mapped to the device, the hypervisor traps the read request, performs the read request on behalf of the guest, and returns to the guest the data read from the memory region. In another example, if the guest attempts to write to the memory region mapped to the device, the hypervisor traps the write request and performs the write request on behalf of the guest.

In an embodiment, hypervisor 140 implements a guest physical address space that can point to any location in memory, which is the system physical address space. The host OS may maintain a guest virtual address space. Hypervisor 140 may create page tables to map virtual to physical memory. When a virtual address inside guest OS 122 is accessed, hypervisor 140 may perform an initial page table translation from the guest virtual address to the guest physical address and then map the guest physical address to the respective system physical address. In an embodiment, hypervisor 140 maintains a page table that has direct guest virtual address to system physical address translations. This page table may speed up the process of retrieving the system physical address in memory that is mapped to the physical device.

In an example, processor 108 may include a page table including a mapping of a virtual address space associated with the physical device to a physical address space corresponding to the memory region that is mapped to the physical device. Hypervisor 140 may mark the entries in the page tables that match the physical device as valid such that guest 122 may access the device. Accordingly, guest 122 may bypass hypervisor 140 and access the device. Hypervisor 140 may also remove access to the device from guest 122. In an example, access to the assigned device may be removed from guest 122 by marking the page entries in the page tables that match the physical device as invalid.

2. Switching from an Emulated Device to an Assigned Device

In an embodiment, switch module 148 may send one or more communications to guest 122 to cause guest 122 to switch from using the emulated device to the assigned device. The assigned device and the emulated device may have a common host backend that is coupled to the host. The actions taken to switch from the emulated device to the assigned device may be similar to the reverse actions taken to switch from the assigned device to the emulated device.

Responsive to the one or more communications to guest 122 to cause guest 122 to switch from using the emulated device to the assigned device, guest 122 may stop using the emulated device. When switch module 148 detects that guest 122 has stopped using the emulated device, switch module 148 may unbind the common host backend from device-specific driver 142 and bind the common host backend to pass-through device driver 144. In this way, switch module 148 may expose the assigned device to guest 122.

Switch module 148 may remove from guest 122 access to the emulated device, and guest 122 may deactivate emulated device driver 126 and activate assigned device driver 124. After switch module 148 removes from guest 122 access to the emulated device, when guest 122 attempts to access the emulated device, hypervisor 140 may send an access denied message to guest 122. As such, guest 122 may only be allowed to access the assigned device. In an example, hypervisor 140 may remove from guest 122 access to the emulated device by marking the page entries in the page tables that match the physical device as valid such that guest 122 may directly access the assigned device and bypass hypervisor 140.

It may be advantageous to switch from the emulated device to the assigned device. With an assigned device, the guest may be able to access the assigned device faster compared to the emulated device. The guest may switch from the emulated device to the assigned device for a variety of reasons. In an example, after the VM migrates to the destination host machine, the guest as part of the migrated VM may switch from the emulated device to the assigned device. In another example, a request is received from the administrator to stop sharing an interface between the plurality of guests. When the request to stop sharing an interface between the plurality of guests is received, switching module 148 may send the one or more communications to guest 122 to cause guest 122 to switch from using the emulated device to the assigned device. In another example, a request is received from the administrator to disable memory overcommitment. When the request to disable memory overcommitment is received, switching module 148 may send the one or more communications to guest 122 to cause guest 122 to switch from using the emulated device to the assigned device.

III. Example Methods

Figure 2:
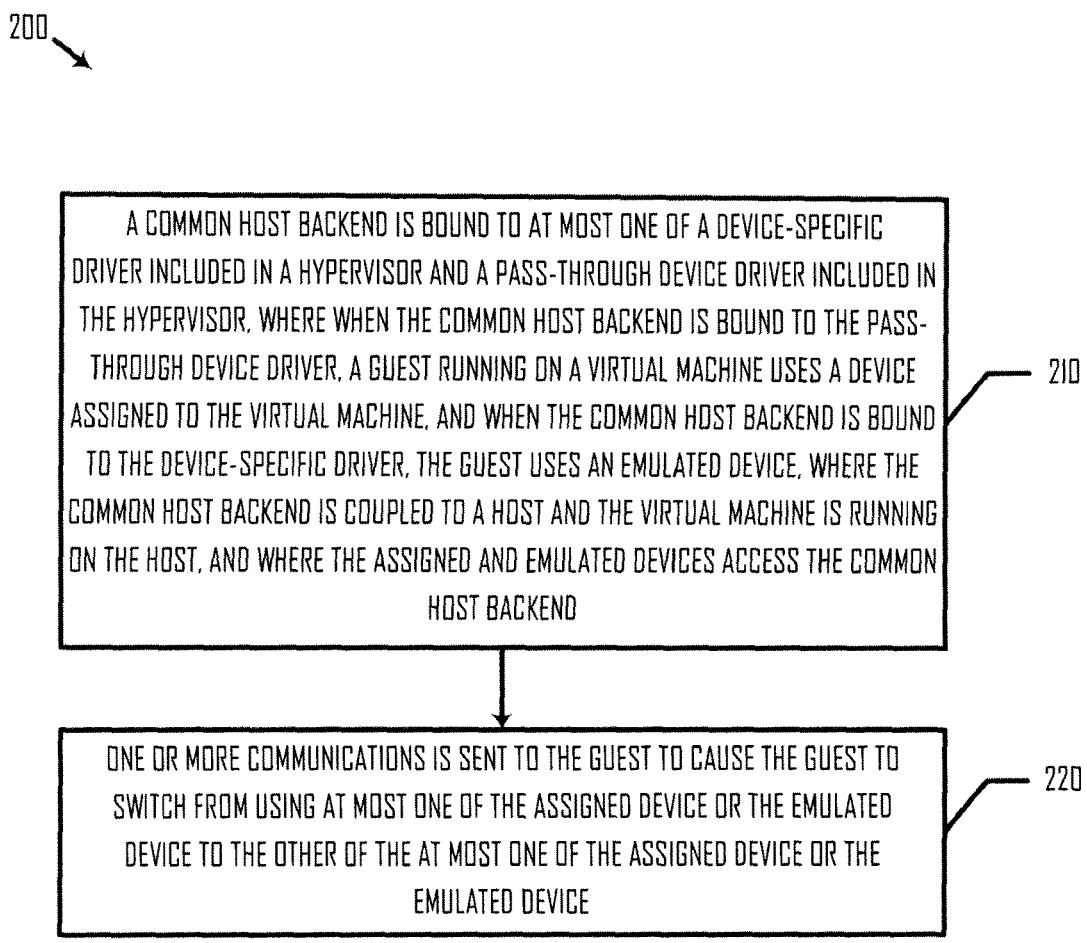
FIG. 2 is a simplified flowchart illustrating a method of switching between an assigned device and an emulated device, according to an embodiment.

FIG. 2 is a simplified flowchart illustrating a method 200 of switching between an assigned device and an emulated device, according to an embodiment. Method 200 is not meant to be limiting and may be used in other applications.

Method 200 includes steps 210-220. In a step 210, a common host backend is bound to at most one of a device-specific driver included in a hypervisor and a pass-through device driver included in the hypervisor, where when the common host backend is bound to the pass-through device driver, a guest running on a virtual machine uses a device assigned to the virtual machine, and when the common host backend is bound to the device-specific driver, the guest uses an emulated device, where the common host backend is coupled to a host and the virtual machine is running on the host, and where the assigned and emulated devices access the common host backend.

In an example, switching module 148 binds a common host backend to at most one of a device-specific driver included in a hypervisor and a pass-through device driver included in the hypervisor, where when the common host backend is bound to the pass-through device driver, a guest running on a virtual machine uses a device assigned to the virtual machine, and when the common host backend is bound to the device-specific driver, the guest uses an emulated device, where the common host backend is coupled to a host and the virtual machine is running on the host, and where the assigned and emulated devices access the common host backend.

In a step 220, one or more communications is sent to the guest to cause the guest to switch from using at most one of the assigned device or the emulated device to the other of the at most one of the assigned device or the emulated device. In an example, switch module 148 sends one or more communications to the guest to cause the guest to switch from using at most one of the assigned device or the emulated device to the other of the at most one of the assigned device or the emulated device.

It is also understood that additional method steps may be performed before, during, or after steps 210-220 discussed above. It is also understood that one or more of the steps of method 200 described herein may be omitted, combined, or performed in a different sequence as desired.

Figure 3:
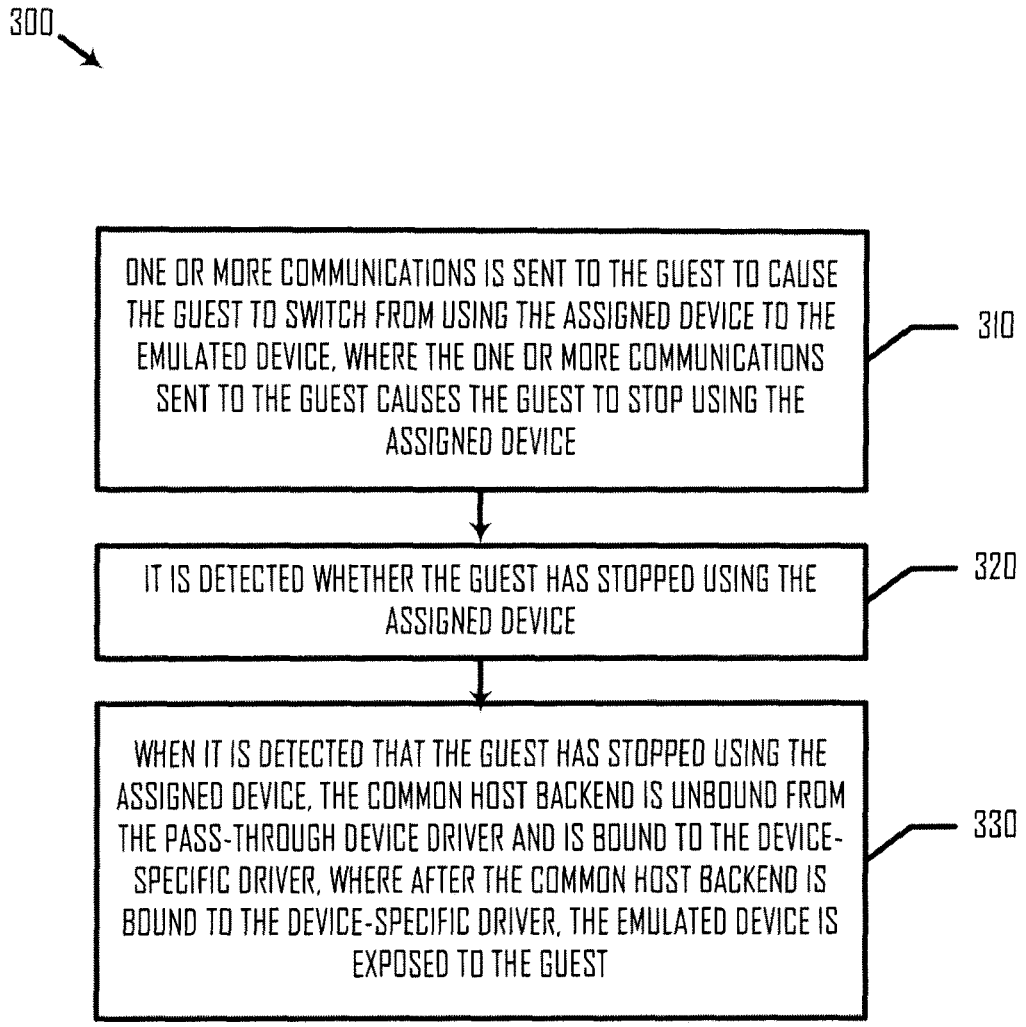
FIG. 3 is a simplified flowchart illustrating a method of switching from an assigned device to an emulated device, according to an embodiment.

FIG. 3 is a simplified flowchart illustrating a method 300 of switching from an assigned device to an emulated device, according to an embodiment. Method 300 is not meant to be limiting and may be used in other applications.

Method 300 includes steps 310-330. In a step 310, one or more communications is sent to the guest to cause the guest to switch from using the assigned device to the emulated device, where the one or more communications sent to the guest causes the guest to stop using the assigned device. In an example, switching module 148 sends one or more communications to guest 122 to cause guest 122 to switch from using the assigned device to the emulated device, where the one or more communications sent to guest 122 causes guest 122 to stop using the assigned device.

In a step 320, it is detected whether the guest has stopped using the assigned device. In an example, switch module 148 detects whether guest 122 has stopped using the assigned device.

In a step 330, when it is detected that the guest has stopped using the assigned device, the common host backend is unbound from the pass-through device driver and is bound to the device-specific driver, where after the common host backend is bound to the device-specific driver, the emulated device is exposed to the guest. In an example, when it is detected that guest 122 has stopped using the assigned device, switching module 148 unbinds the common host backend from the pass-through device driver and binds the common host backend to the device-specific driver, where after the common host backend is bound to the device-specific driver, the emulated device is exposed to the guest.

It is also understood that additional method steps may be performed before, during, or after steps 310-330 discussed above. It is also understood that one or more of the steps of method 300 described herein may be omitted, combined, or performed in a different sequence as desired.

Figure 4:
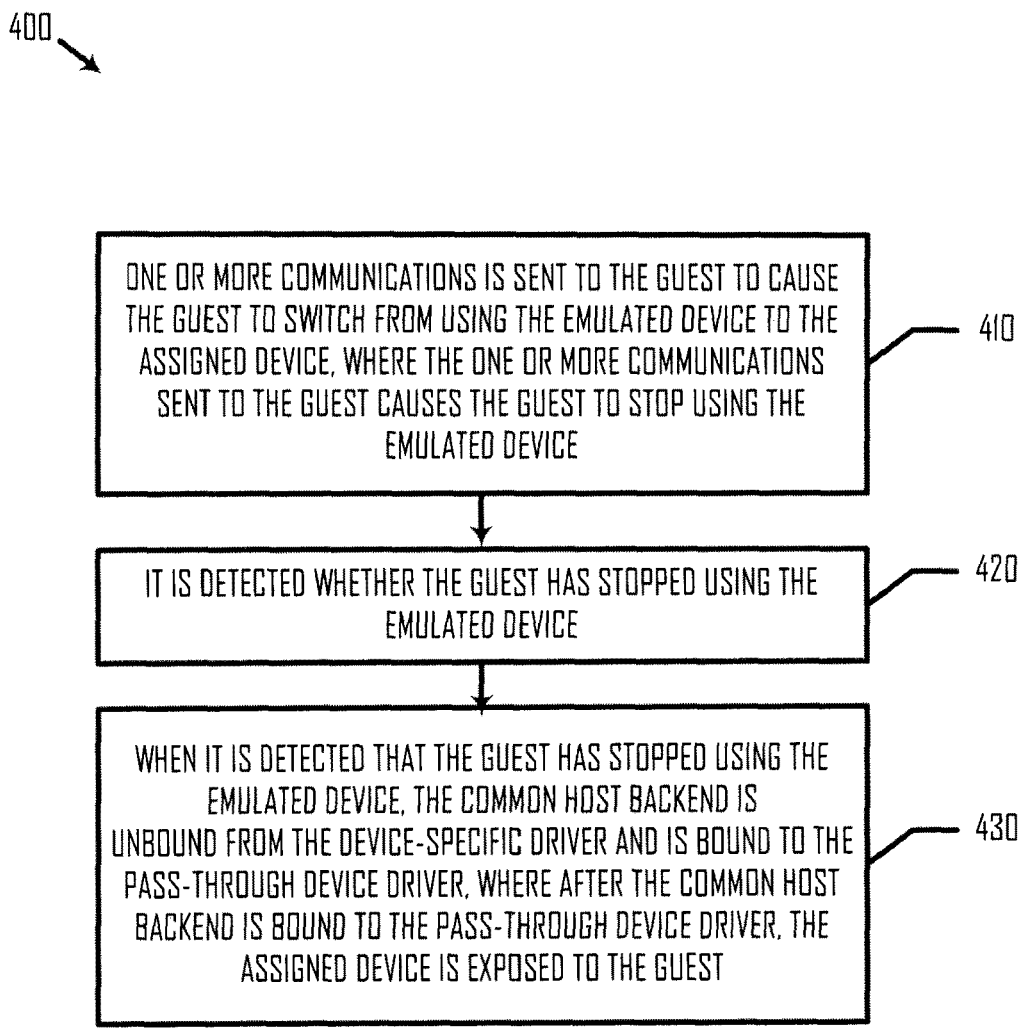
FIG. 4 is a simplified flowchart illustrating a method of switching from an emulated device to an assigned device, according to an embodiment.

FIG. 4 is a simplified flowchart illustrating a method 400 of switching from an emulated device to an assigned device, according to an embodiment. Method 400 is not meant to be limiting and may be used in other applications.

Method 400 includes steps 410-430. In a step 410, one or more communications is sent to the guest to cause the guest to switch from using the emulated device to the assigned device, where the one or more communications sent to the guest causes the guest to stop using the emulated device. In an example, switching module 148 sends one or more communications to guest 122 to cause guest 122 to switch from using the emulated device to the assigned device, where the one or more communications sent to guest 122 causes guest 122 to stop using the emulated device.

In a step 420, it is detected whether the guest has stopped using the emulated device. In an example, switch module 148 detects whether guest 122 has stopped using the emulated device.

In a step 430, when it is detected that the guest has stopped using the emulated device, the common host backend is unbound from the device-specific driver and is bound to the pass-through device driver, where after the common host backend is bound to the pass-through device driver, the assigned device is exposed to the guest. In an example, when it is detected that guest 122 has stopped using the emulated device, switching module 148 unbinds the common host backend from the device-specific driver and binds the common host backend to the pass-through device driver, where after the common host backend is bound to the pass-through device driver, the assigned device is exposed to the guest.

It is also understood that additional method steps may be performed before, during, or after steps 410-430 discussed above. It is also understood that one or more of the steps of method 400 described herein may be omitted, combined, or performed in a different sequence as desired.

Figure 5:
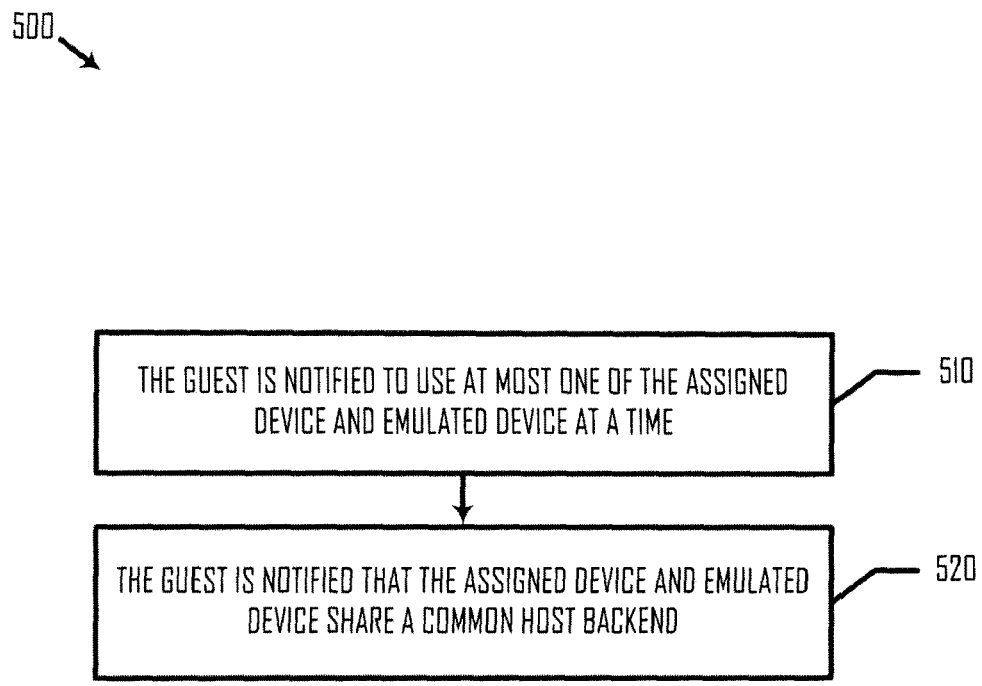
FIG. 5 is a block diagram of an electronic system suitable for implementing one or more embodiments of the present disclosure.

FIG. 5 is a simplified flowchart illustrating a method 500 of notifying the guest of the assigned and emulated devices, according to an embodiment. Method 500 is not meant to be limiting and may be used in other applications.

Method 500 includes steps 510-520. In a step 510, the guest is notified to use at most one of the assigned device and emulated device at a time. In an example, hypervisor 140 notifies guest 122 to use at most one of the assigned device and emulated device at a time.

In a step 520, the guest is notified that the assigned device and emulated device share a common host backend. In an example, hypervisor 140 notifies guest 122 that the assigned device and emulated device share a common host backend.

It is also understood that additional method steps may be performed before, during, or after steps 510-520 discussed above. It is also understood that one or more of the steps of method 500 described herein may be omitted, combined, or performed in a different sequence as desired.

IV. Example Computing System

Figure 6:
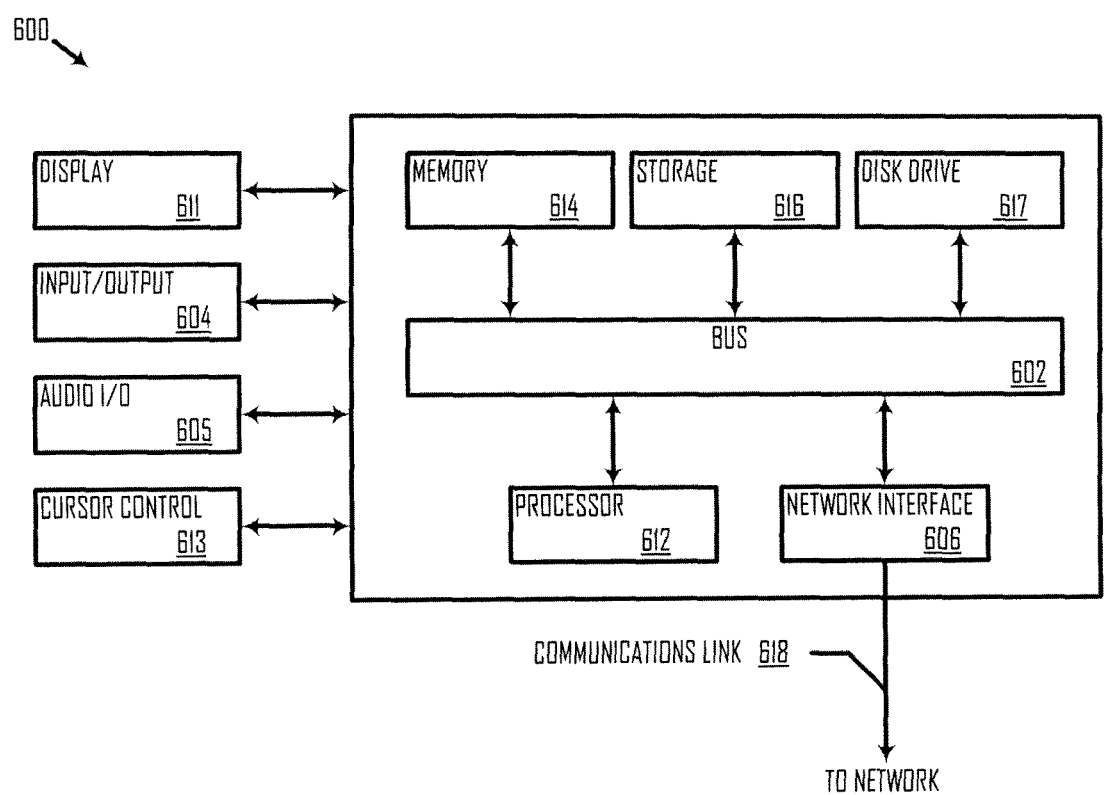
FIG. 6 is a block diagram of a computer system suitable for implementing one or more embodiments of the present disclosure.

FIG. 6 is a block diagram of a computer system 600 suitable for implementing one or more embodiments of the present disclosure. In various implementations, host machine 102 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including tele-communications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A system for switching between an assigned device and an emulated device, the system comprising:
one or more processors;
a device-specific driver included in a hypervisor running on a host;
a pass-through device driver included in the hypervisor, wherein a common host backend is coupled to the host and is bound to at most one of the device-specific driver and pass-through device driver at a time, wherein when the common host backend is bound to the pass-through device driver, a first guest running on a first virtual machine uses an assigned device that is assigned to the first virtual machine, and when the common host backend is bound to the device-specific driver, the first guest and a second guest running on a second virtual machine uses an emulated device,
wherein the first and second virtual machines are running on the host, and the assigned and emulated devices access the common host backend; and
a switch module that sends, by one or more processors, one or more communications to the first guest to cause the first quest to switch from using at most one of the assigned device or the emulated device to the other of the at most one of the assigned device or the emulated device, wherein if the common host backend is bound to the pass-through driver, the one or more communications indicates that the assigned device is to be removed and causes the first guest to stop using the assigned device, wherein in response to detecting that the first guest has stopped using the assigned device, the switch module removes the first guest's access to the assigned device, unbinds the common host backend from the pass-through device driver, and binds the common host backend to the device-specific driver, wherein after the common host backend is bound to the device-specific driver, the first and second guests access the emulated device, and
wherein if the common host backend is bound to the device-specific driver, the one or more communications indicates that the emulated device is to be removed and causes the first guest to stop using the emulated device, wherein in response to detecting that the first guest has stopped using the emulated device, the switch module removes the first guest's access to the emulated device, unbinds the common host backend from the device-specific device driver, and binds the common host backend to the pass-through driver, wherein after the common host backend is bound to the pass-through driver, the second guest does not have access to the assigned device.

2. The system of claim 1,
wherein the switch module detects that the first guest has stopped using the assigned device, and
wherein the switch module exposes the emulated device to the first guest.

3. The system of claim 2, wherein the first guest includes an assigned device driver and an emulated device driver, and the assigned device is bindable to the assigned device driver and the emulated device is bindable to the emulated device driver, and wherein the first guest deactivates the assigned device driver and activates the emulated device driver.

4. The system of claim 1, wherein after the switch module removes from the first guest access to the assigned device, when the first guest attempts to access the assigned device the hypervisor sends an access denied message to the first guest.

5. The system of claim 2, wherein when the common host backend is bound to the pass-through device driver, the pass-through device driver receives a first request from the first guest to access the assigned device and forwards the first request to the common host backend, and
when the common host backend is bound to the device-specific driver, the device-specific driver receives a second request from the first guest to access the emulated device and processes the second request on behalf of the first guest.

6. The system of claim 2, wherein the switch module receives a notification that the first virtual machine is to be migrated to a second host, and responsive to the notification the switch module sends the one or more communications to the first guest to cause the first guest to switch from using the assigned device to the emulated device, the system further comprising:
a migration module that, after the first guest switches to using the emulated device, migrates a state of the first virtual machine to the second host,
wherein when the migration module migrates the state of the first virtual machine, the common host backend is bound to the device-specific driver.

7. The system of claim 2, wherein the switch module receives a request to enable memory overcommit for the first virtual machine and responsive to the request, the switching module sends the one or more communications to the first guest to cause the first guest to switch from using the assigned device to the emulated device.

8. The system of claim 1,
wherein the switch module detects that the first guest has stopped using the emulated device and exposes the assigned device to the first guest,
wherein the first guest includes an emulated device driver and an assigned device driver, and the emulated device is bindable to the emulated device driver and the assigned device is bindable to the assigned device driver, and
wherein the first guest deactivates the emulated device driver and activates the assigned device driver.

9. The system of claim 1, wherein after the switch module removes from the first guest access to the emulated device, when the first guest attempts to access the emulated device, the hypervisor sends an access denied message to the first guest.

10. The system of claim 1, wherein the hypervisor notifies the first guest to use at most one of the assigned device and emulated device at a time.

11. The system of claim 1, wherein the hypervisor notifies the first guest that the assigned device and emulated device share a common host backend.

12. The system of claim 1, wherein the switch module receives a request to use an interface that is used by the first guest for the second guest, and responsive to the request the switch module sends the one or more communications to cause the first guest to switch from using the assigned device to the emulated device.

13. A method of switching between an assigned device and an emulated device, the method comprising:
binding a common host backend to at most one of a device-specific driver included in a hypervisor and a pass-through device driver included in the hypervisor, wherein when the common host backend is bound to the pass-through device driver, a first guest running on a first virtual machine uses a device assigned to the first virtual machine, and when the common host backend is bound to the device-specific driver, the first guest and a second guest running on a second virtual machine uses an emulated device,
wherein the common host backend is coupled to a host and the first and second virtual machines are running on the host, and the assigned and emulated devices access the common host backend;
sending one or more communications to the first guest to cause the first guest to switch from using at most one of the assigned device or the emulated device to the other of the at most one of the assigned device or the emulated device, wherein if the common host backend is bound to the pass-through driver, the one or more communications indicates that the assigned device is to be removed and causes the first guest to stop using the assigned device, and wherein if the common host backend is bound to the device-specific driver, the one or more communications indicates that the emulated device is to be removed and causes the first guest to stop using the emulated device;
in response to detecting that the first guest has stopped using the assigned device:
removing the first guest's access to the assigned device;
unbinding the common host backend from the pass-through device driver; and
binding the common host backend to the device-specific driver, wherein after the common host backend is bound to the device-specific driver, the first and second guests access the emulated device; and
in response to detecting that the first guest has stopped using the emulated device:
removing the first guest's access to the emulated device;
unbinding the common host backend from the device-specific device driver; and
binding the common host backend to the pass-through driver, wherein after the common host backend is bound to the pass-through driver, the second guest does not have access to the assigned device.

14. The method of claim 13, the method further comprising:
detecting that the first guest has stopped using the assigned device, wherein after the common host backend is bound to the device-specific driver, the emulated device is exposed to the first guest.

15. The method of claim 14, wherein the first guest includes an assigned device driver and an emulated device driver, and the assigned device is bindable to the assigned device driver and the emulated device is bindable to the emulated device driver, wherein the first guest deactivates the assigned device driver and activates the emulated device driver.

16. The method of claim 13, the method further comprising:
   detecting that the first guest has stopped using the emulated device;
   when it is detected that the first guest has stopped using the emulated device, unbinding the common host backend from the device-specific driver and binding the common host backend to the pass-through device driver,
   wherein after the common host backend is bound to the pass-through device driver, the assigned device is exposed to the first guest.

17. The method of claim 13, wherein the sending includes sending a hot unplug request.

18. The method of claim 13, wherein the sending includes sending a device failure report.

19. A non-transitory machine-readable medium comprising a plurality of machine-readable instructions that when executed by one or more processors are adapted to cause the one or more processors to perform a method comprising:
   binding a common host backend to at most one of a device-specific driver included in a hypervisor and a pass-through device driver included in the hypervisor,
   wherein when the common host backend is bound to the pass-through device driver, a guest running on a first virtual machine uses a device assigned to the first virtual machine, and when the common host backend is bound to the device-specific driver, the first guest and a second guest running on a second virtual machine uses an emulated device, wherein the common host backend is coupled to a host and the first virtual machine is running on the host, and the assigned and emulated devices access the common host backend;
   sending one or more communications to the first guest to cause the first guest to switch from using at most one of the assigned device or the emulated device to the other of the at most one of the assigned device or the emulated device, wherein if the common host backend is bound to the pass-through driver, the one or more communications indicates that the assigned device is to be removed and causes the first guest to stop using the assigned device, and wherein if the common host backend is bound to the device-specific driver, the one or more communications indicates that the emulated device is to be removed and causes the first guest to stop using the emulated device;
   in response to detecting that the first guest has stopped using the assigned device:
      removing the first guest's access to the assigned device;
      unbinding the common host backend from the pass-through device driver; and
      binding the common host backend to the device-specific driver, wherein after the common host backend is bound to the device-specific driver, the first and second guests running on the host access the emulated device; and
   in response to detecting that the first guest has stopped using the emulated device:
      removing the first guest's access to the emulated device;
      unbinding the common host backend from the device-specific device driver; and
      binding the common host backend to the pass-through driver, wherein after the common host backend is bound to the pass-through driver, the second guest does not have access to the assigned device.

* * * * *

UNITED STATES PATENT AND TRADEMARK OFFICE
CERTIFICATE OF CORRECTION

| | |
|---|---|
| PATENT NO. | : 9,658,873 B2 |
| APPLICATION NO. | : 13/972544 |
| DATED | : May 23, 2017 |
| INVENTOR(S) | : Michael Tsirkin |

It is certified that error appears in the above-identified patent and that said Letters Patent is hereby corrected as shown below:

In the Claims

In Column 14, Line 48, please change "quest" to --guest--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*